United States Patent
Lee et al.

(10) Patent No.: US 9,747,427 B2
(45) Date of Patent: Aug. 29, 2017

(54) STORAGE DEVICE READER HAVING SECURITY FUNCTION AND SECURITY METHOD USING THEREOF

(71) Applicant: BEFS CO., LTD., Seoul (KR)

(72) Inventors: Seung Jin Lee, Yongin-si (KR); Chang Hyeok Bang, Seoul (KR)

(73) Assignee: BEFS CO., LTD., Seoul (KR)

( * ) Notice: Subject to any disclaimer, the term of this patent is extended or adjusted under 35 U.S.C. 154(b) by 26 days.

(21) Appl. No.: 14/356,058

(22) PCT Filed: Jul. 10, 2013

(86) PCT No.: PCT/KR2013/006130
§ 371 (c)(1),
(2) Date: May 2, 2014

(87) PCT Pub. No.: WO2014/017761
PCT Pub. Date: Jan. 30, 2014

(65) Prior Publication Data
US 2014/0325642 A1   Oct. 30, 2014

(30) Foreign Application Priority Data
Jul. 23, 2012 (KR) .................. 10-2012-0080233

(51) Int. Cl.
*G06F 21/31* (2013.01)
*H04L 29/06* (2006.01)
*G06F 21/44* (2013.01)

(52) U.S. Cl.
CPC .............. *G06F 21/31* (2013.01); *G06F 21/44* (2013.01); *H04L 63/083* (2013.01); *H04L 63/0876* (2013.01)

(58) Field of Classification Search
CPC .......... G06F 21/44; G06F 21/31; G06F 21/30; H04L 63/083; H04L 63/0876
See application file for complete search history.

(56) References Cited

U.S. PATENT DOCUMENTS

2003/0167395 A1* 9/2003 Chang ............... G06F 21/34
713/183
2005/0137988 A1* 6/2005 Harris ............... G07B 17/0008
705/401

(Continued)

FOREIGN PATENT DOCUMENTS

CN   1542630 A   11/2004
CN   1639664 A   7/2005

(Continued)

OTHER PUBLICATIONS

Oishi et al. "Machine Translation of KR 10-2004-00994334" Korean Patent information Online Network, Nov. 2004, pp. 1-22, http://kposd.kipo.go.kr:8088/kiponet/up/kpion/pdfView.do?langCd=EN&pdfFileName=outPDFcwgazr1020040029482EN.pdf&applno=1020040029482&pdfDocType=0&docKind=KPIONPUBEB1PDF.*

(Continued)

*Primary Examiner* — Jung Kim
*Assistant Examiner* — Carlos M De Jesus Lassala
(74) *Attorney, Agent, or Firm* — Novick, Kim & Lee, PLLC; Jae Youn Kim

(57) ABSTRACT

Disclosed is a storage device reader for interfacing a storage device and a user terminal, which includes a storage unit and a control unit. The data storage unit stores reader recognition information uniquely assigned to the storage device reader. The control unit retrieves reader recognition information stored in the storage device, determines whether or not the retrieved reader recognition information matches reader recognition information stored in the data storage unit, and transferring a file list stored in the storage device to the user terminal if the retrieved reader recognition information matches the stored reader recognition information.

5 Claims, 3 Drawing Sheets

(56) References Cited

U.S. PATENT DOCUMENTS

2007/0262142 A1* 11/2007 Whitehouse ......... G06Q 10/087
235/385
2012/0042099 A1* 2/2012 Wong ..................... G06F 21/44
710/9

FOREIGN PATENT DOCUMENTS

| JP | 06-75862 A | | 3/1994 |
|---|---|---|---|
| KR | 10-2004-0029482 | * | 11/2004 |
| KR | 10-2010-0067997 A | | 6/2010 |
| KR | 10-1156102 B1 | | 6/2012 |

OTHER PUBLICATIONS

Oishi et al. "Machine Translation of KR 10-2004-00994334" Korean Patent information Online Network, Nov. 2004, pp. 1-22, http://kposd.kipo.go.kr:8088/kiponet/up/kpion/pdfView.do?langCd=EN&pdfFileName=out_PDF_cw_gaz_r_1020040029482_EN.pdf&applno=1020040029482&pdfDocType=0&docKind=KPIONPUBEB1 PDF.*

* cited by examiner

ЅТORAGE DEVICE READER HAVING
SECURITY FUNCTION AND SECURITY
METHOD USING THEREOF

TECHNICAL FIELD

The present invention relates to a storage device reader, and more specifically, to a storage device reader provided with a security function.

BACKGROUND ART

Utilization of portable storage devices, e.g., USB memory and the like, is increasing. Although private information of an individual such as a security certificate or the like is stored in the portable storage devices, the information is exposed to other people and frequently lost or stolen in many case due to the portability, and probability of leaking the important data stored therein to outside is also getting increased.

However, many of the portable storage devices are not equipped with a security function for the internal data. Although some of the portable storage devices have the security function, the security level is low, and it is not easy to use since a user should set details of security. Particularly, when the security is set using separate security software, a host computer is heavily loaded, and thus there is a limit in encrypting the data in real-time.

Furthermore, an encryption key value used in the process of encrypting or decrypting a data can be exposed while the encryption key value is read from the host computer.

DISCLOSURE OF INVENTION

Technical Problem

Therefore, the present invention has been made in view of the above problems, and it is an object of the present invention to strengthen a security function of a storage device and, specifically, strengthen security of a storage device in a method of identifying a reader and the storage device.

Technical Solution

A storage device reader of the present invention for accomplishing the above object includes a data storage unit and a control unit.

The data storage unit stores reader recognition information uniquely assigned to the storage device reader.

The control unit retrieves reader recognition information stored in the storage device, determines whether or not the retrieved reader recognition information matches the reader recognition information stored in the data storage unit, and transfers a file list stored in the storage device to the user terminal if the retrieved reader recognition information matches the stored reader recognition information.

In another embodiment of the storage device reader of the present invention, the data storage unit further stores a unique memory number randomly assigned to the storage device. In this case, the control unit retrieves a unique memory number stored in the storage device, determines whether or not the retrieved unique memory number matches the unique memory number stored in the data storage unit, and transfers the file list stored in the storage device to the user terminal if the retrieved unique memory number matches the unique memory number stored in the data storage unit.

In the storage device reader of the present invention, the data storage unit further stores a password of a user. In this case, the control unit determines whether or not a password received from the user terminal matches the password stored in the data storage unit and transfers the file list stored in the storage device to the user terminal if the password received from the user terminal matches the password stored in the data storage unit.

The control unit of the storage device reader of the present invention may securely process contents of the storage device by converting a data storage area of the storage device into a read-only area of a CD-ROM type and transmitting the read-only area to the user terminal.

In the storage device reader of the present invention, the control unit transmits a message for formatting the portable storage device to the user terminal if the reader recognition information stored in the portable storage device does not match the reader recognition information stored in the data storage unit and stores the reader recognition information stored in the data storage unit into the portable storage device if a format command is received from the user terminal.

A portable storage device security method using a storage device reader according to the present invention includes the steps of: retrieving, by the storage device reader, reader recognition information from the portable storage device and determining whether or not the retrieved reader recognition information matches reader recognition information stored in the data storage unit; and transferring a file list of the portable storage device to the user terminal if the retrieved reader recognition information matches the stored reader recognition information.

The portable storage device security method using a storage device reader according to the present invention may include the steps of: retrieving, by the storage device reader, a unique memory number from the portable storage device and determining whether or not the retrieved unique memory number matches a unique memory number stored in the data storage unit; and transferring the file list of the portable storage device to the user terminal if the retrieved reader recognition information matches the stored reader recognition information.

The portable storage device security method using a storage device reader according to the present invention may include the steps of: transmitting a message for formatting the portable storage device to the user terminal if the reader recognition information stored in the portable storage device does not match the reader recognition information stored in the data storage unit; and storing the reader recognition information stored in the data storage unit into the portable storage device if a format command is received from the user terminal.

The portable storage device security method using a storage device reader according to the present invention may further include the step of: randomly assigning, by the storage device reader, a unique memory number and storing the unique memory number into the storage device and the data storage unit.

Advantageous Effects

The present invention may strengthen security of a portable storage device furthermore since a file stored in a portable storage device can be confirmed only when a specific reader is provided and the portable storage device is identified.

DESCRIPTION OF SYMBOLS

Figure 1:
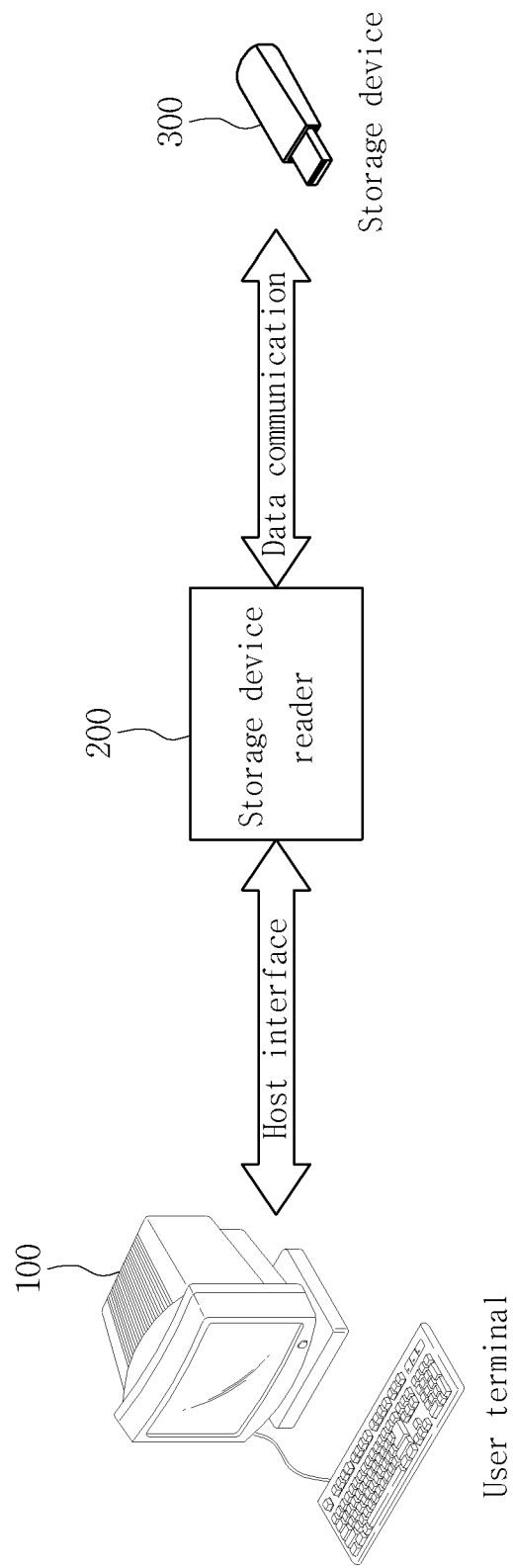
FIG. 1 is a view showing the configuration of a storage device reader, a user terminal and a storage device according to the present invention.

100: User terminal
200: Storage device reader
210: Host interface engine
220: Control unit
230: Data storage unit
240: Encryption/Decryption processing unit
250: Storage device engine
300: Portable storage device

BEST MODE FOR CARRYING OUT THE INVENTION

Hereafter, the present invention will be described in detail with reference to the accompanying drawings.

FIG. 1 is a view showing the configuration of a storage device reader, a user terminal and a storage device according to the present invention.

As shown in FIG. 1, the present invention operates by connecting a user terminal 100, a storage device reader 200 and a storage device 300.

The user terminal 100 is a host device to which the storage device reader 200 is connected, which includes all kinds of devices capable of connecting and using an external storage device, such as a mobile terminal or the like, in addition to a general PC such as a desktop computer, a notebook computer or the like.

The storage device 300 includes various kinds of storage devices which can store data, such as USB memory, a memory card, a hard disk, an SSD and the like.

The user terminal 100 and the storage device reader 200 may be connected using various types of interfaces including USB, IEEE1394, E-IDE, E-SATA, SATA, SCSI, BlueTooth, WIFI, LAN and the like.

Figure 2:
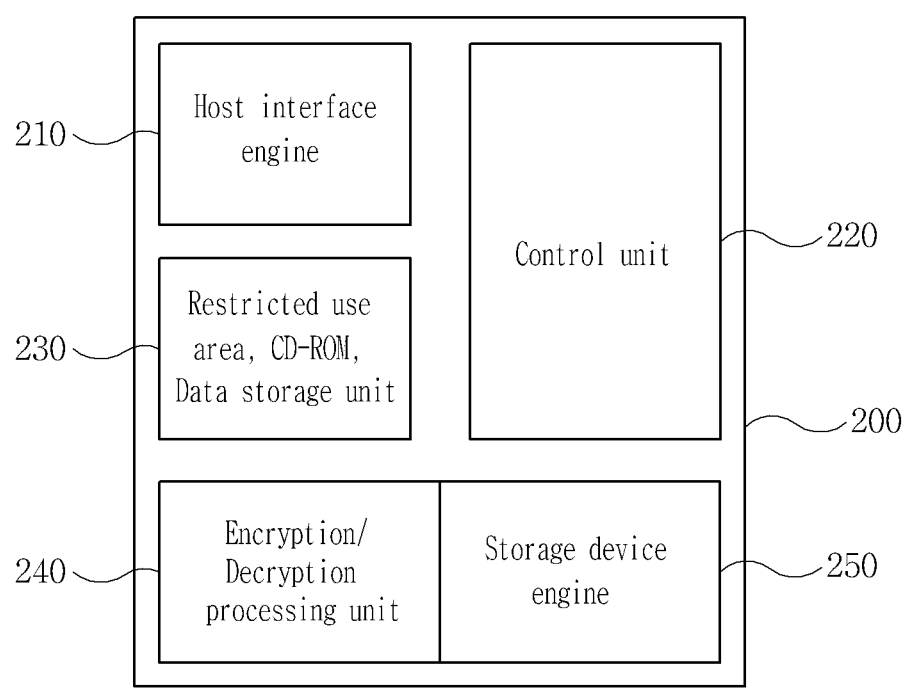
FIG. 2 is a view showing the configuration of a storage device reader according to the present invention.

FIG. 2 is a view showing the configuration of a storage device reader according to the present invention.

The storage device reader 200 includes a host interface engine 210, a control unit 220, a data storage unit 230, an encryption/decryption processing unit 240 and a storage device engine 250.

The host interface engine 210 performs a function which allows the storage device reader 200 to communicate with the user terminal 100 through an interface such as a USB, IEEE1394, E-IDE, E-SATA, SATA, SCSI, BlueTooth, WIFI, LAN or the like.

The USB is an abbreviation of Universal Serial Bus, which means a general-purpose serial bus for substituting various kinds of conventional serial/parallel type connections, which is one of input and output standards used for connecting a computer and peripheral devices. Accordingly, the USB is used to connect a variety of devices such as a keyboard, a mouse, a scanner, a digital camera, a printer, PDA, a storage device and the like.

IEEE 1394 is also called as FireWire or I-Link, which is a serial bus interface standard specification for a personal computer, a digital audio player and a digital video player, proposed by Apple Computer, USA, and supports high-speed data transmission and isochronous real-time data service.

E-IDE, E-SATA, SATA and SCSI are interfaces for connecting a hard disk or the like, the BlueTooth is a near field communication specification, the WiFi is a wireless Internet, and the LAN is a local area network which is a general Internet connection method.

An interface used for connecting the portable storage device 200 and the user terminal 100 may be selected according to high-speed data processing and its convenience. Each of the interfaces communicates with the user terminal 100 in a unique method according to the specification of a corresponding interface.

The control unit 220 retrieves reader recognition information stored in the storage device 300 and determines whether or not the reader recognition information matches reader recognition information stored in the data storage unit 230, and if they are matched, the control unit 220 transfers a file list stored in the storage device 300 to the user terminal 100. According to such a process, internal data of the storage device 300 may be confirmed only when the storage device 300 is connected to the user terminal 100 through the storage device reader 200 which has initialized the corresponding device. In addition, the data stored in the storage device 300 is encrypted, and, in addition, although a physical access to the data is attempted, the encrypted data cannot be extracted and decrypted without the reader recognition information of the storage device reader 200.

The control unit 220 reads the Mater Boot Record (MBR) sector of the connected storage device 300 and confirms whether or not the storage device reader 200 has performed a security format. If the security format is not performed, the control unit 220 transfers a system message requesting the security format to the user terminal 100 to secure the entire storage space of the storage device 300. The security format is a process of storing recognition information such as an ID value or the like of the storage device reader 200 and recognition information of the storage device 300 together so that a physical authentication process may not pass if the ID values of the storage device reader 200 and the storage device 300 are not equal.

The control unit 220 may securely process contents of the storage device 300 by converting a data storage area of the storage device 300 into a read-only area of a CD-ROM type and transmitting the read-only area to the user terminal.

If the reader recognition information stored in the storage device 300 does not match the reader recognition information stored in the data storage unit 230, the control unit 220 transmits a message for formatting the storage device 300 to the user terminal 100. If a format command is received from the user terminal 100, the control unit 220 formats the storage device 300 and stores the reader recognition information stored in the data storage unit 230 into the storage device 300.

The data storage unit 230 stores reader recognition information uniquely assigned to the storage device reader 200. Here, a serial number or the like of the storage device reader 200 may be used as the reader recognition information. The reader recognition information of the storage device reader

200 is stored in the storage device 300 when the storage device 300 connected to the storage device reader 200 is initialized.

As another embodiment of the storage device reader 200 of the present invention, the data storage unit 230 may further store a unique memory number randomly assigned to the storage device 300. In this case, if the storage device 300 is connected to the storage device reader 200, the control unit 220 retrieves a unique memory number stored in the storage device 300 and compares with the unique memory number stored in the data storage unit 230. If the retrieved unique memory number matches the stored unique memory number, the control unit 220 transfers a file list stored in the storage device 300 to the user terminal 100.

As still another embodiment of the present invention, the data storage unit 230 of the storage device reader 200 may further store a password of a user. In this case, the control unit 220 determines whether or not a password received from the user terminal 100 matches the password stored in the data storage unit 230, and the storage device reader 200 is activated and transfers a file list stored in the storage device 300 to the user terminal 100 only when the passwords are matched. The data storage unit 230 stores a user program capable of performing a security function of the storage device reader 200 and setting a password and a function of the storage device reader 200, and a data storage area is provided to the user terminal in the form of a CD-ROM area through the user program. An authentication procedure using a password is performed such that if the storage device 300 is connected to the storage device reader 200 and the storage device reader 200 is connected to the user terminal 100, the user program is driven and receives a password. If authentication fails more than a predetermined number of times, activation of a password input window is delayed, and if the authentication fails more than a permitted number of times, activation of the storage device reader 200 is restricted, and the connected storage device 300 is also initialized or restricted according to a setting. In addition, it may be designed such that the user program continuously confirms whether or not the storage device reader 200 is connected to the user terminal 100, and if an interrupt indicating separation of the storage device reader 200 is sensed at the user terminal 100, the program is immediately terminated. Through this, it is possible to prevent hacking the program unless otherwise the recognition information such as an ID value or the like of the storage device reader 200 is confirmed.

The storage device reader 200 may further include an encryption/decryption processing unit 240 for processing encryption and decryption in hardware in the process of storing and retrieving data in and from the storage device 300. If the encryption/decryption processing unit 240 processes the encryption and decryption in hardware, the encryption and decryption may be promptly processed without imposing a load on the processor of the user terminal 100, and, in addition, since an encryption key is not delivered to the user terminal 100 in the encryption and decryption process, security is improved.

The storage device engine 250 is a functional unit for connecting the storage device reader 200 to the storage device 300 and accomplishing data communication. Various kinds of storage devices 300 such as USB memory, a memory card, a hard disk, an SSD and the like can be connected to the storage device reader 200, and each of the devices has a different interface. Accordingly, the storage device engine 250 may have a plurality of interfaces to connect various different kinds of storage devices 300. However, it is also possible to be equipped with only one interface so that only a specific kind of storage device 300 may be connected.

Figure 3:
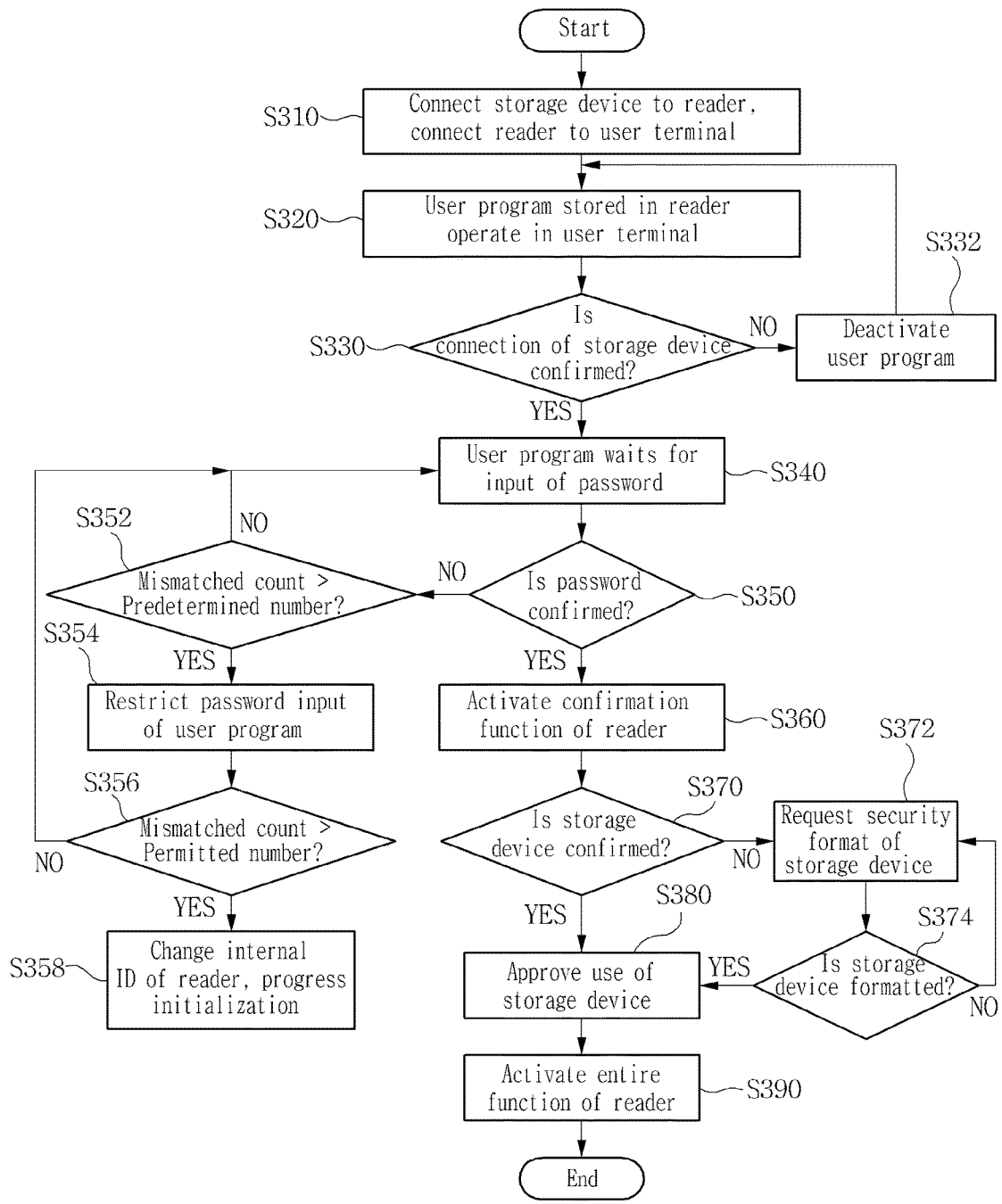
FIG. 3 is a view showing an example of a security method using a storage device reader according to the present invention.

FIG. 3 is a view showing an example of a security method using a storage device reader according to the present invention.

If the storage device 300 is connected to the storage device reader 200 and the storage device reader 200 is also connected to the user terminal 100 S310, a user program stored in the data storage unit 230 of the storage device reader 200 operates on the user terminal 100 S320.

If only the storage device reader 200 is connected to the user terminal 100 and the storage device 300 is not connected to the storage device reader 200 S330, the user program is deactivated, and if the storage device 300 is connected to the storage device reader 200, the user program requests a password from the user terminal 100 and waits for an input S340.

If a password is input from the user terminal 100, success of authentication is confirmed by comparing an authentication password stored in the data repository of the storage device reader 200 with the input password S350, and if the user is authenticated, a confirmation function of the storage device reader 200 is activated S360. If the password received from the user terminal 100 does not match the stored authentication password S352, re-input of the password from the user terminal 100 is requested for a predetermined number of times S340, and if the passwords do not match more than a predetermined number of times, password input may be restricted in a method of delaying the password input time S354. In addition, if the passwords do not matched consecutively more than a permitted number of times, the security level may be raised by changing the internal ID of the storage device reader 200 and initializing the storage device 300 S358.

If the password received from the user terminal 100 is authenticated, the control unit 220 of the storage device reader 200 confirms the storage device 300 by comparing recognition information of the storage device reader 200 with recognition information of the storage device 300 S370, and if the two pieces of the recognition information are equal, use of the storage device 300 is approved S380, and the entire function of the storage device reader 200 is activated S390.

If the recognition information of the storage device reader 200 does not match the recognition information of the storage device 300, the control unit 220 of the storage device reader 200 transmits a message for formatting the storage device 300 to the user terminal 100 S372. If a format command is received from the user terminal 100, the storage device 300 is formatted, and the reader recognition information stored in the data storage unit 230 is stored into the storage device 300 S374.

In the storage device reader according to the present invention and the data encryption method using thereof, each of the components may be implemented in an independent or combined form inside one chip, and its shape is not restricted to a specific form.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A storage device reader for interfacing a storage device and a user terminal, the reader comprising:

a storage unit programmed to store reader recognition information uniquely assigned to the storage device reader, a user program, and a password; and a control unit programmed:

to operate the user program on the user terminal when the storage device is connected to the storage device reader and the storage device reader is also connected to the user terminal, to deactivate the user program when the storage device reader is connected to the user terminal and the storage device is not connected to the storage device reader, to authenticate a user by comparing a password received from the user terminal with the password stored in the storage unit through the user program, to request for a predetermined number of times the user to re-input the password through the user program if the password received from the user terminal does not match with the password stored in the storage unit, to restrict the user from inputting the password through the user program if the received password does not match more than the predetermined number of times, to store the reader recognition information of the storage device reader to the storage device, to retrieve the reader recognition information stored in the storage device, to determine whether or not the retrieved reader recognition information matches the reader recognition information stored in the storage unit of the storage device reader, to transfer a file list stored in the storage device to the user terminal if the retrieved reader recognition information matches the stored reader recognition information, to transmit a message for formatting the storage device to the user terminal if the retrieved reader recognition information does not match the stored reader recognition information, and to format the storage device in response to the message by storing the reader recognition information stored in the storage unit into the storage device if a format command is received from the user terminal.

2. The reader according to claim 1, wherein the reader recognition information includes a unique memory number randomly assigned to the storage device.

3. The reader according to claim 1, wherein the control unit converts a data storage area of the storage device into a read-only area of a CD-ROM type and transmits the read-only area to the user terminal.

4. A method of securely managing a storage device using a storage device reader comprising a storage unit and a control unit and connectable to a user terminal, the method comprising the steps of:

assigning unique reader recognition information to the storage device reader and storing the reader recognition information to the storage unit of the storage device reader, a user program, and a password;

operating the user program on the user terminal when the storage device is connected to the storage device reader and the storage device reader is also connected to the user terminal, deactivating the user program when the storage device reader is connected to the user terminal and the storage device is not connected to the storage device reader, authenticating, through the user program, a user by comparing a password received from the user terminal with the password stored in the storage unit, requesting, through the user program, for a predetermined number of times the user to re-input the password if the password received from the user terminal does not match with the password stored in the storage unit, restricting, through the user program, the user from inputting the password if the received password does not match more than the predetermined number of times, storing the reader recognition information of the storage device reader stored in the storage unit to the storage device;

retrieving, by the storage device reader, the reader recognition information from the storage device;

determining whether or not the retrieved reader recognition information matches the reader recognition information stored in the storage unit; and transferring a file list of the storage device to a user terminal if the retrieved reader recognition information matches the stored reader recognition information, transmitting a message for formatting the storage device to the user terminal if the retrieved reader recognition information does not match the stored reader recognition information, and formatting the storage device in response to the message by storing the reader recognition information stored in the storage unit into the storage device if a format command is received from the user terminal.

5. The method according to claim 4, wherein the reader recognition information includes a unique memory number randomly assigned to the storage device.

* * * * *